Patented Sept. 17, 1946

2,407,686

UNITED STATES PATENT OFFICE 2,407,686

SULPHANILAMIDE DERIVATIVES AND METHOD OF PREPARING SAME

Simon L. Ruskin, New York, N. Y., assignor to Frances R. Ruskin

No Drawing. Application April 21, 1943, Serial No. 483,946

9 Claims. (Cl. 260—209)

The present invention relates to the manufacture of new and improved therapeutic preparations of the sulphanilamide type, and more particularly, to sulphanilamide derivatives containing radicals of substances produced in animal metabolism.

It is the general object of the invention to provide improved agents for combatting infections of various kinds and containing radicals which make them more compatible with the animal organism and at least in certain instances, make such agents selective in their bactericidal or bacteriostatic action.

It is a further object of the invention to provide sulphanilamide derivatives of reduced toxicity, and particularly compounds characterized by reduced kidney damage and even by the total absence of such injurious action.

It is also an object of the invention to prepare sulphanilyl derivative of compounds having the carbon-nitrogen ring of hydantoin and their substitution products, and also of compounds produced by the hydrolytic and/or metabolic degradation of nucleoproteins, such compounds including the nucleic acids of yeast, muscle or other origin, the isolated nucleotides and particularly the purine nucleotides, creatin, creatinine, and the amino- and carbon-substituted derivatives of hydantoin, such as amino-phenyl-hydantoin, methyl-hydantoin, thio-hydantoin, etc.

In preparing the compounds of the present invention, the methods generally found applicable for producing $N^1$-substituted derivatives of p-substituted-benzene sulphonamides may be resorted to. The simplest and preferred method is to react a p-substituted-benzene sulphohalide (preferably the chloride) with an amino compound of the type above set forth, hydrogen halide being thereby split off and condensation of the benzene sulpho compound with the amino compound effected. The p-substituent of the benzene sulpho halide can be the amino group, a nitro group or an acyl amino group, for example, an acyl amino, proprionyl amino, butyryl amino, benzoyl amino, and the like. It is preferable to employ a compound whose p-substituent is a nitro group or an acyl amino group, as a p-amino group is likely to take part in the reaction. After the reaction is completed, the p-nitro or p-acyl amino group can be replaced with an amino group by a suitable reduction of the nitro group, as by means of Raney nickel, and hydrogen, or in any other known manner, or by saponification of an acyl amino group.

The compounds of the present invention are characterized by additional therapeutic values over the known therapeutic activity of sulphanilamide or by suppression of certain of the undesirable side reactions accompanying the use of sulphanilamide, or by both these results. By incorporating a nucleic acid or nucleotide radical in the sulphanilamide compound, there is obtained a marked increase in the range of bactericidal action. These derivatives are less toxic than sulphanilamide and possess a unique detoxifying effect in severe infections which is not common to other sulpha drugs. These derivatives are particularly effective in the treatment of infections caused by viruses. It appears that the bactericidal properties are enhanced by the presence of the phosphoric acid radical of the nucleic acid and nucleotide groups. The derivatives prepared with the hydantoins, such as amino-phenyl- and amino-methyl-hydantoin possess an anti-convulsant as well as bactericidal action, and are therefore indicated in conditions, such as chorea, in which an infection is frequently associated with convulsive seizures. These $N^1$-hydantoin derivatives thus combine the properties of a bactericide and anti-convulsant. The acidic compound itself may be used or the alkali or alkaline earth metal compound may be prepared either by neutralization with the corresponding base, or during the splitting off of the acyl group attached to the $N^4$ where an acyl-substituted p-amino group was present in the starting benzene sulphohalide compound.

In the case of sulpha creatine and sulpha creatinine, compounds are made available which, while possessing the bactericidal and/or bacteriostatic action of sulphanilamide, are characterized by the fact that their use solves the important problem of kidney damage. The commonly used sulpha compounds tend to accumulate and crystallize out in the kidneys, thereby causing serious kidney lesions and in some cases even death from anuria. Supha-creatin and creatinine do not show this tendency to precipitate in the kidneys, probably because of their high solubility in urine.

The more favorable action of the sulpha-derivatives above described is probably due, at least in part, to the fact that the introduced radicals are substances normally occurring in the body and hence compatible with body tissues and fluids. Also, because the introduced radicals, or at least some of them, have specific actions on certain actions on certain parts of the body, they tend to seek out and accumulate in such parts. In consequence, a high concentration of the sulpha drug is brought to certain more or less specific organs or tissues and infections thereat are thereby more vigorously combatted.

The following examples illustrate procedures for preparing various sulpha-derivatives in accordance with the invention:

EXAMPLE 1

Preparation of sodium sulphanilyl phenyl hydantoin 10 g. phenylaminohydantoin were dissolved under cooling to about 10° C. in 100 cc. pyridine and slowly treated under stirring with 12 g. (1 equivalent) acetyl sulphanilyl chloride, care being taken to keep the reaction mixture at 10–15 degrees C. The reaction mixture was then allowed to stand for five hours at room temperature. It was then diluted with 10 volumes of water. The resulting precipitate was filtered and washed with water. Yield 11 g. It is insoluble in water. It was recrystallized by dissolving in 1 equivalent dilute sodium hydroxide and precipitating with acetic acid. M. P. 24° C. The acetyl group was removed by methyl alcohol ammonia. The resulting solution was concentrated in vacuo to dryness and treated with water and the residue so obtained was recrystallized by dissolving in sodium hydroxide and precipitated with dilute acetic acid. M. P. 200–205° C.

EXAMPLE 2

Preparation of sulphanilyl creatine 10 g. acetyl sulphanilyl chloride were dissolved in 50 cc. pyridine and slowly treated under stirring with 5 g. (1 equivalent) creatine. During this addition the creatine went into solution with the formation of an orange colored liquid. There was also an evolution of heat, the reaction mixture reaching a temperature of about 40° C. It was allowed to cool spontaneously, and then kept at room temperature without stirring for six hours. The reaction mixture was filtered free of a slight precipitate and the filtrate was then treated with an excess of ether. An orange-colored precipitate was obtained, which was semisolid. After standing overnight the supernatant was poured off. The residue was extracted several times with ether, whereupon it hardened and became filterable. The precipitate was recrystallized from 50 cc. boiling alcohol. Yield 6 g. M. P. 115° C. It is soluble in water. A second crop of 4½ g. was obtained by treating the alcoholic filtrate with ether. The acetyl sulphanilyl creatine was hydrolyzed by refluxing for 1 hr. with 1 equivalent of sodium methoxide in 150 cc. methyl alcohol and concentrating to about 50 cc. in vacuo. Yield 4 g. No sharp melting point was obtained, the product precipitates as the sodium salt.

EXAMPLE 3

Preparation of sulphanilyl creatinine 5 g. creatinine were suspended in 50 cc. pyridine and slowly treated under stirring with 10 g. (1 equivalent) acetyl sulfanilyl chloride. The addition was carried out at such a rate so that no considerable rise of temperature developed. During the addition the solution turned dark red. The reaction mixture was stirred for two hours and then allowed to stand at room temperature overnight. The next day the precipitate was filtered. Yield 9 g. It was dark red. It was then extracted with 100 cc. hot 95% alcohol, leaving an orange colored residue of about 3 g. On cooling of the alcohol solution, precipitation took place. Yield 3 g. M. P. 240° C. The acetyl group was removed by refluxing for 15 minutes with 1 equivalent of sodium methoxide in 75 cc. methyl alcohol. The resulting solution was concentrated in vacuo to 25 cc. and treated with excess ether. A dark brown precipitate was formed which would not melt, the substance being the sodium salt.

EXAMPLE 4

Preparation of p-nitro-benzene-sulphone-creatinine 25 g. creatinine and 50 g. nitrobenzene-sulpho-chloride (1 equivalent) were fused together at 100–115° C. for six hours. Before fusing the creatinine was dried at 100° C. and the nitrobenzene-sulpho-chloride in vacuo over sulphuric acid. During the fusion, the reaction mixture was protected from atmospheric moisture by means of calcium chloride. The fused mass was extracted with approximately 250 cc. hot methyl alcohol. On cooling the precipitate was added to the extracted residue. Total yield 55 g. or 83%. After two or three recrystallizations with activated charcoal from 15 volumes of boiling methyl alcohol a pure white compound is obtained. M. P. 210° C.

Analysis: N—{19.1.3
Found{18.94
Theory—18.79

The probable formula of the product is:

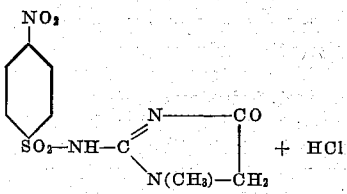

EXAMPLE 5

Preparation of 5-p-nitrobenzene-sulphonamide)-phenyl-hydantoin 3 g. of 5-amino-5-phenyl-hydantoin were dissolved in 30 cc. pyridine. To this solution under stirring and cooling were slowly added 3.6 g. (1 equivalent) nitrobenzene-sulpho-chloride. Complete solutions of both components took place. After about one hour a white precipitate began to form. Stirring was then stopped and the reaction mixture was allowed to stand at room temperature over night. It was then diluted with 150 cc. water and again allowed to stand over night. The white precipitate formed was filtered off by suction and washed with water. Yield 5.8 g. The product is insoluble in acetone and in alcohol. A small amount was recrystallized for analysis from boiling ethyl alcohol. M. P. 240–245° C.

Analysis: N—14.68} found
14.89} theory

The product has the formula:

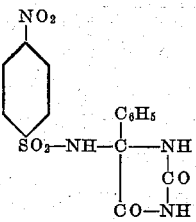

EXAMPLE 6

Preparation of 5-(acetylsulphanilyl-amino) 5-phenyl-hydantoin 21 g. (0.9 mol.) of acetylsulphanilyl chloride were dissolved in 100 cc. pyridine and slowly treated under stirring and cooling with 13.5 g. (0.7 mol.) of 5-amino-5-phenyl-hydantoin, care being taken to keep the temperature below 15° C. Stirring was continued for another hour after the final addition of the hydantoin and the reaction mixture allowed to stand at room temperature over night. The following day it was diluted with 500 cc. water and placed on ice a few hours. A voluminous white precipitate was obtained which was filtered by suction and washed thoroughly with water. Yield 20 g. or 74% of theory. M. P. 230° C. The product is slightly soluble in hot ethyl alcohol and insoluble in acetone, benzene, ether and chloroform. It was purified for analysis by dissolving it in one equivalent of dilute sodium hydroxide and precipitating by acidifying the solution with dilute acetic or hydrochloric acid.

The probable formula of the product is:

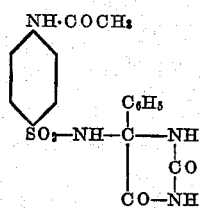

EXAMPLE 7

Preparation of sulphanilyl nucleic acid 5 g. (5.6 equivalents) acetyl sulphanilyl chloride were dissolved in 50 cc. pyridine and slowly treated under stirring and cooling with 5 g. yeast nucleic acid (1 equivalent). The temperature should, preferably, be kept below 15° C. The reaction mixture was stirred for three hours more, and the resulting product filtered with suction and washed free of pyridine with acetone. Yield 8 g. M. P. 165° C. The product is insoluble in acetone, alcohol, ether, benzene and chloroform, but is soluble in dilute alkali, from which it does not precipitate well on acidification with dilute acetic or hydrochloric acid, probably due to hydrolytic splitting of the nucleic acid. The acetyl group was removed by refluxing with 8 equivalents of sodium methoxide in 300 cc. methyl alcohol for an hour. Yield 6 g. The product is the sodium salt and is soluble in water. The acetylated product has the formula $$C_{38}H_{45}O_{29}N_{15}P_4(O_2S \cdot C_6H_4 \cdot NH \cdot COCH_3)_4$$

EXAMPLE 8

Preparation of p-nitro-benzene-sulphone-nucleic acid 11 g. (0.05 mol.) of p-nitro-benzene-sulphochloride were dissolved in 100 cc. pyridine and slowly treated under stirring and cooling with 13 g. (0.01 mol.) yeast nucleic acid, care being taken to keep the temperature below 15° C. The reaction mixture was stirred for another three hours after the final addition of the nucleic acid and then allowed to stand at room temperature over night. The following day the reaction product was filtered by suction and thoroughly washed free of pyridine with acetone. It was dried in a vacuum desiccator. Yield 20 g. The product is insoluble in alcohol, ether, acetone, benzene, and chloroform.

Analysis: S—5.57% found
6.26% theory

The product is soluble in dilute sodium hydroxide, but does not precipitate well on acidification with dilute acetic or hydrochloric acid. The analysis and yield show that 4 molecules of p-nitrobenzene-sulpho-chloride have reacted with one molecule of yeast nucleic acid.

The formula of the product is $$C_{38}H_{45}O_{29}N_{15}P_4(O_2S \cdot C_6H_4 \cdot NO_2)_4$$

EXAMPLE 9

Preparation of sulphanilyl adenylic acid 2 g. acetyl sulphanilyl chloride (1.5 equivalent) were disssolved in 25 cc. pyridine and slowly treated, under stirring with 2 g. (1 equivalent) adenylic acid. During the addition there was a slight rise of temperature. After the final addition of adenylic acid the reaction mixture was stirred for 2½ hours at room temperature. The resulting precipitate was filtered and washed with acetone. Yield 3 g. M. P. 145° C. The product has the formula

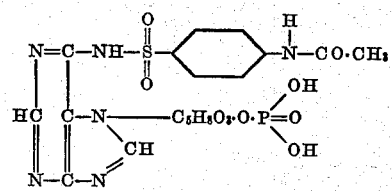

It is insoluble in water, alcohol, ether, acetone and benzene, but is soluble in dilute sodium hydroxide from which does not precipitate well on addition of dilute acetic or hydrochloric acid. The acetyl group was removed by refluxing with 2 equivalents of sodium methoxide in 100 cc. methyl alcohol for 1 hour, and followed by concentrating the resulting solution to a small volume and then adding excess ether. The product, which is the sodium salt, has no sharp melting point.

As already indicated either the free acidic compounds or their sodium, potassium, lithium, calcium and other metal compounds can be used. Because of the solubility of certain of the salts, the drugs can be administered intravenously. However, the other modes of administration employed for sulpha drugs can be used, for example, by mouth intramuscularly, or applied to the infected parts directly, as upon open wounds. The dosages correspond to those employed for known sulpha drugs.

It will be apparent from the foregoing that selective effects can be obtained by use of the appropriate hydrolytic or metabolic degradation products of nucleic acids. Thus by employing different nucleotides of the purine or pyrimidine types, the known different physiological actions of the individual nucleotides can be utilized.

I claim:

1. Sulphanilyl adenylic acid.
2. Sulphanilyl nucleic acid.
3. The method of forming improved therapeutic agents which comprises reacting a para- X=N- benzene sulphohalide, wherein X is a member of the group consisting of H₂, O₂ and

R being an acyl radical, with a member of the group consisting of nucleic acids and isolated nucleotides.

4. The method of forming improved therapeutic agents which comprises reacting an acyl sulphanilyl chloride with a nucleic acid.

5. A sulphanilyl derivative of a purine nucleotide.

6. A sulphanilyl derivative of a pyrimidine nucleotide.

7. The sulphanilyl derivatives of a member of the group consisting of nucleic acids and isolated nucleotides.

8. Compounds of the formula

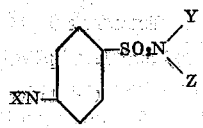

wherein X is a member of the group consisting of $H_2$, $O_2$ and $$\begin{array}{c} H \\ \diagdown \\ R \end{array}$$

R being an acyl radical, while Y is a member of the group consisting of hydrogen and metals, and =N-Z represents a nucleic acid radical.

9. Compounds of the formula

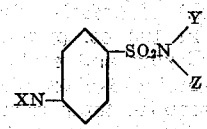

wherein X is a member of the group consisting of $H_2$, $O_2$ and $$\begin{array}{c} H \\ \diagdown \\ R \end{array}$$

R being an acyl radical, while Y is a member of the group consisting of hydrogen and metals, and =N-Z represents a nucleotide radical.

SIMON L. RUSKIN.